US011151257B2

(12) United States Patent
Shah et al.

(10) Patent No.: US 11,151,257 B2
(45) Date of Patent: Oct. 19, 2021

(54) METHOD AND APPARATUS FOR SECURE DEVICE BOOT

(71) Applicant: NETGEAR, INC., San Jose, CA (US)

(72) Inventors: Mihir Dushyantbhai Shah, San Jose, CA (US); Tejas Pankajkumar Shah, San Jose, CA (US); Peiman Amini, Mountain View, CA (US); Joseph Amalan Arul Emmanuel, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 308 days.

(21) Appl. No.: 16/446,443

(22) Filed: Jun. 19, 2019

(65) Prior Publication Data

US 2019/0384917 A1 Dec. 19, 2019

Related U.S. Application Data

(60) Provisional application No. 62/687,142, filed on Jun. 19, 2018.

(51) Int. Cl.
*G06F 21/57* (2013.01)
*G06F 21/44* (2013.01)
(Continued)

(52) U.S. Cl.
CPC ............ *G06F 21/575* (2013.01); *G06F 8/65* (2013.01); *G06F 9/4416* (2013.01); *G06F 21/44* (2013.01); *G06F 21/572* (2013.01); *H04L 9/3268* (2013.01); *H04L 41/0816* (2013.01); *H04L 63/083* (2013.01); *H04L 63/0823* (2013.01); *H04L 63/107* (2013.01); *H04L 67/10* (2013.01); *H04W 4/80* (2018.02); *H04W 12/086* (2021.01);
(Continued)

(58) Field of Classification Search
CPC ...... G06F 21/44; G06F 21/572; G06F 21/575; G06F 2209/5014; G06F 2221/033; G06F 2221/2111; G06F 8/65; G06F 9/4401; G06F 9/4416
See application file for complete search history.

(56) References Cited

U.S. PATENT DOCUMENTS 6,463,535 B1 10/2002 Drews
8,793,774 B1 7/2014 Kumar et al.
(Continued)

*Primary Examiner* — Terrell S Johnson
(74) *Attorney, Agent, or Firm* — Perkins Coie LLP

(57) ABSTRACT

Introduced here are technologies for securely booting a network access device or a satellite device. A network-accessible server system may receive a boot request that includes a boot certificate to identify the network access device. The network-accessible server system may determine that the boot certificate corresponds with a verified boot certificate listed on a boot certificate registry. The network-accessible server system may determine that a geographical location of the network access device and a mobile application executing on an electronic device are within a predetermined range. The network-accessible server system may distribute a digital certificate to the network access device based on determining that the boot certificate corresponds with any verified boot certificate listed on the boot certificate registry and determining that the geographical location of the network access device and the mobile application executing on the electronic device are within the predetermined range.

21 Claims, 12 Drawing Sheets

(51) Int. Cl.
*H04L 9/32* (2006.01)
*G06F 8/65* (2018.01)
*H04W 4/80* (2018.01)
*H04L 12/24* (2006.01)
*H04L 29/06* (2006.01)
*H04L 29/08* (2006.01)
*H04W 60/00* (2009.01)
*G06F 9/4401* (2018.01)
*H04W 12/30* (2021.01)
*H04W 12/086* (2021.01)

(52) U.S. Cl.
CPC .......... *H04W 12/30* (2021.01); *H04W 60/00* (2013.01); *G06F 9/4401* (2013.01); *G06F 2221/033* (2013.01); *G06F 2221/2111* (2013.01)

(56) References Cited

U.S. PATENT DOCUMENTS

| | | | |
|---|---|---|---|
| 10,180,845 | B1 | 1/2019 | Nunes |
| 2003/0188161 | A1 | 10/2003 | Ndiaye |
| 2005/0071675 | A1 | 3/2005 | Chu et al. |
| 2005/0071677 | A1* | 3/2005 | Khanna ................ H04L 67/34 726/4 |
| 2005/0091496 | A1 | 4/2005 | Hyser |
| 2006/0271782 | A1 | 11/2006 | Ishiyama et al. |
| 2008/0046548 | A1 | 2/2008 | Doran et al. |
| 2008/0209515 | A1 | 8/2008 | Ibrahim et al. |
| 2010/0082987 | A1 | 4/2010 | Thom et al. |
| 2010/0185845 | A1 | 7/2010 | Takayama et al. |
| 2011/0066838 | A1 | 3/2011 | Takayama et al. |
| 2014/0181498 | A1 | 6/2014 | Rhee et al. |
| 2014/0181517 | A1 | 6/2014 | Alaranta et al. |
| 2014/0372743 | A1 | 12/2014 | Rogers et al. |
| 2015/0074764 | A1 | 3/2015 | Stern |
| 2016/0087933 | A1* | 3/2016 | Johnson ................ H04L 67/34 709/245 |
| 2017/0048070 | A1* | 2/2017 | Gulati ..................... G06F 21/73 |
| 2017/0272316 | A1 | 9/2017 | Johnson et al. |
| 2018/0123804 | A1 | 5/2018 | Smith et al. |
| 2018/0165480 | A1 | 6/2018 | Raju |
| 2018/0191695 | A1 | 7/2018 | Lindemann |
| 2018/0204007 | A1 | 7/2018 | Rangayyan |
| 2019/0007204 | A1 | 1/2019 | Field et al. |
| 2019/0158353 | A1 | 5/2019 | Johnson et al. |
| 2019/0384916 | A1 | 12/2019 | Shah et al. |
| 2019/0386977 | A1 | 12/2019 | Shah et al. |
| 2020/0244297 | A1 | 7/2020 | Zalewski et al. |
| 2020/0403808 | A1 | 12/2020 | Smith et al. |

* cited by examiner

900

RECEIVE, FROM A MOBILE APPLICATION, A SATELLITE BOOT REQUEST THAT INCLUDES A SATELLITE BOOT CERTIFICATE OF A SATELLITE DEVICE AND MOBILE APPLICATION CREDENTIALS 902

DETERMINE THAT THE SATELLITE BOOT CERTIFICATE CORRESPONDS WITH A VERIFIED SATELLITE BOOT CERTIFICATE 904

DETERMINE, USING THE RECEIVED CREDENTIALS, THAT THE MOBILE APPLICATION IS VALID 906

UPON DETERMINING THAT BOTH THE SATELLITE BOOT CERTIFICATE AND THE MOBILE APPLICATION CREDENTIALS ARE VALID, DISTRIBUTE, USING A NETWORKING DEVICE, AN ONLINE CERTIFICATE ASSOCIATED WITH THE NETWORKING DEVICE, INTENDED FOR THE SATELLITE DEVICE 908

RECEIVE A REGISTRATION REQUEST INITIATED FROM THE SATELLITE DEVICE, THE REQUEST CONTAINING SUITABLE REGISTRATION DATA 910

GRANT THE REGISTRATION REQUEST 912

FIGURE 9

METHOD AND APPARATUS FOR SECURE DEVICE BOOT

CROSS-REFERENCES TO RELATED APPLICATIONS

This application claims priority to U.S. Provisional Patent Application No. 62/687,142, titled "SECURITY MECHANISMS FOR NETWORKING DEVICES AND ASSOCIATED TECHNIQUES" and filed on Jun. 19, 2018, which is hereby incorporated by reference in its entirety.

TECHNICAL FIELD

Various embodiments concern mechanisms for securely booting a network access device in such a manner to resist unauthorized access by malicious software (also referred to as "malware").

BACKGROUND

Secure Boot is a security standard developed by members of the personal computer industry to ensure that an electronic device boots using only software that is trusted by the Original Equipment Manufacturer (OEM). Often considered a key feature of the Unified Extensible Firmware Interface (UEFI), Secure Boot defines an entirely new interface between the operating system and the firmware.

When firmware is initiated during the start-up process of an electronic device, the firmware can check the digital signature (or simply "signature") of each piece of boot-related software, including UEFI firmware drivers (also referred to as "Read-Only Memories (ROMs)" or "Option ROMs"), EFI applications, and the operating system. If these signatures are valid, then the firmware will grant control to the operating system.

When enabled and fully configured, Secure Boot helps the electronic device resist unauthorized access by malicious software (also referred to as "malware"). For example, Secure Boot can detect tampering with boot loaders, key operating system files, and unauthorized Option ROMs by validating their signatures. Instances of tampering can be addressed in real time (i.e., during the start-up process) to prevent malware from infecting the electronic device

SUMMARY

Some embodiments of the present disclosure concern different techniques for securely booting a network access device. A network-accessible server system may receive a first input indicative of a request to initiate a boot process for a network access device. The network-accessible server system may parse the first input to discover information representative of a boot certificate that identifies the network access device as the source of the request and compare the boot certificate to a registry of verified boot certificates. In some embodiments the first input includes the boot certificate itself, while in other embodiments the first input includes information related to the boot certificate. The network-accessible server system may determine that the boot certificate matches a record in the registry corresponding to a verified boot certificate.

Securely booting a network access device may include the network-accessible server system establishing a geographical location of the network access device and a geographical location of an electronic device on which a computer program associated with the network-accessible server system resides. The network-accessible server system may determine whether the geographical location of the network access device and the geographical location of the electronic device are within a predetermined proximity of one another. Responsive to determining that the network access device and the electronic device are located within the predetermined proximity of one another, the network-accessible server system may distribute a digital certificate to the network access device that permits the network access device to complete the boot process.

Some embodiments of the present disclosure may include securely onboarding or booting a satellite device. Techniques are described for when the satellite device becomes alive, the application on the electronic device (such as the application on a user's cell phone) detects the presence of the satellite device. The electronic device subsequently transmits data to the cloud system. The transmitted data includes data indicating ownership of the satellite device and user or other credentials of the electronic device application. The cloud system verifies the received data by comparing the received data with other data, such as previously stored data. Once the received data is verified, the cloud system associates the satellite device. In addition, techniques are described for automatically updating the firmware of each satellite device, rather than relying on manual or other types of user-controlled schemes, such as programmed, periodic updating tasks.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

FIG. 9 is a high-level flow diagram of a process for onboarding or booting a satellite device, consistent with various embodiments.

Figure 1:
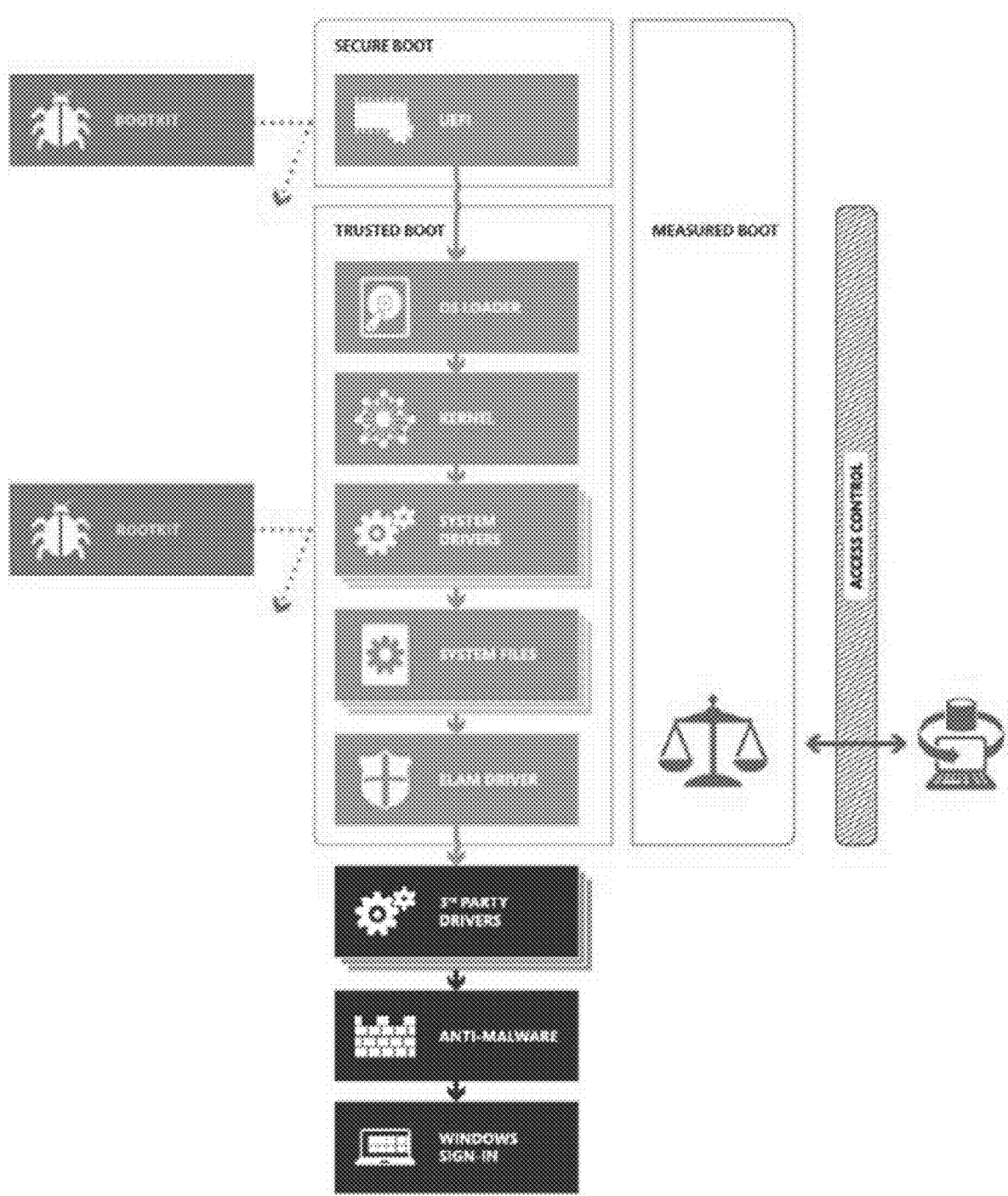
FIG. 1 illustrates a conventional startup process employed by a personal computer executing a Windows 10® operating system, according to the prior art.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Introduced here are technologies for securely booting a network access device or a satellite device. For example, a network-accessible server system may receive a boot request that includes a boot certificate to identify the network access device. The network-accessible server system may determine that the boot certificate corresponds with a verified boot certificate listed on a boot certificate registry. The network-accessible server system may determine that a geographical location of the network access device and a mobile application executing on an electronic device are within a predetermined range. The network-accessible server system may distribute a digital certificate to the network access device based on determining that the boot certificate corresponds with any verified boot certificate listed on the boot certificate registry and determining that the geographical location of the network access device and the mobile application executing on the electronic device are within the predetermined range.

Terminology

Embodiments may be described with reference to particular computer programs, system configurations, networks, etc. However, those skilled in the art will recognize that these features can be applicable to other computer program types, system configurations, network types, etc. For example, although the term "Wi-Fi network" may be used to describe a network, the relevant embodiment could be deployed in another type of network.

Moreover, the technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device (e.g., a base station or a network-connected computer server) to examine video content generated by an electronic device, identify elements included in the video content, apply a classification model to determine an appropriate action, and perform the appropriate action.

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (e.g., in the sense of "including but not limited to").

The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. In some embodiments, the steps may be performed in any suitable sequence or combination. For example, steps could be added to, or removed from, the processes described herein. Similarly, steps could be replaced or reordered. Thus, descriptions of any processes are intended to be open-ended.

Technology Overview

Conventionally, Secure Boot works similar to a security gate. A module providing valid credentials will be permitted through the security gate (and thus allowed to execute). However, Secure Boot will block modules with bad credentials or no credentials. FIG. 1 illustrates a conventional startup process employed by a personal computer executing a Windows 10® operating system, according to the prior art.

When a personal computer initiates a start-up process, the computer first finds the operating system bootloader. Personal computers without Secure Boot will simply run whatever bootloader is stored on the hard drive. In such instances, there is no way for the personal computer to tell whether the bootloader corresponds to a trusted operating system or a rootkit.

Conversely, when a personal computer equipped with Unified Extensible Firmware Interface (UEFI) starts, the personal computer initially verifies that the firmware is digitally signed by an authorized entity, such as the Original Equipment Manufacturer (OEM), thereby reducing the risk of inadvertently running firmware rootkits. If Secure Boot is enabled, the firmware will examine the bootloader's digital signature (or simply "signature") to verify that it hasn't been modified. If the bootloader is fully intact, the firmware will start the bootloader if either the bootloader was signed using a trusted certificate or the user has manually approved the bootloader's signature. However, such a process is only possible on personal computers equipped with UEFI and a Trusted Platform Module (TPM) chip, which stores the encryption keys necessary for authentication.

Introduced here, therefore, are secure boot processes and mechanisms that can be employed by other types of electronic devices. (e.g., routers, modems, switches, access points (APs), etc.). Collectively, these devices may be referred to as "network access devices." When employed by a network access device attempting to onboard onto a network, these secure boot mechanisms can serve as an additional safeguard on top of those employed by the electronic devices (e.g., personal computers and mobile phones) that are communicatively coupled to the network access device.

Figure 2:
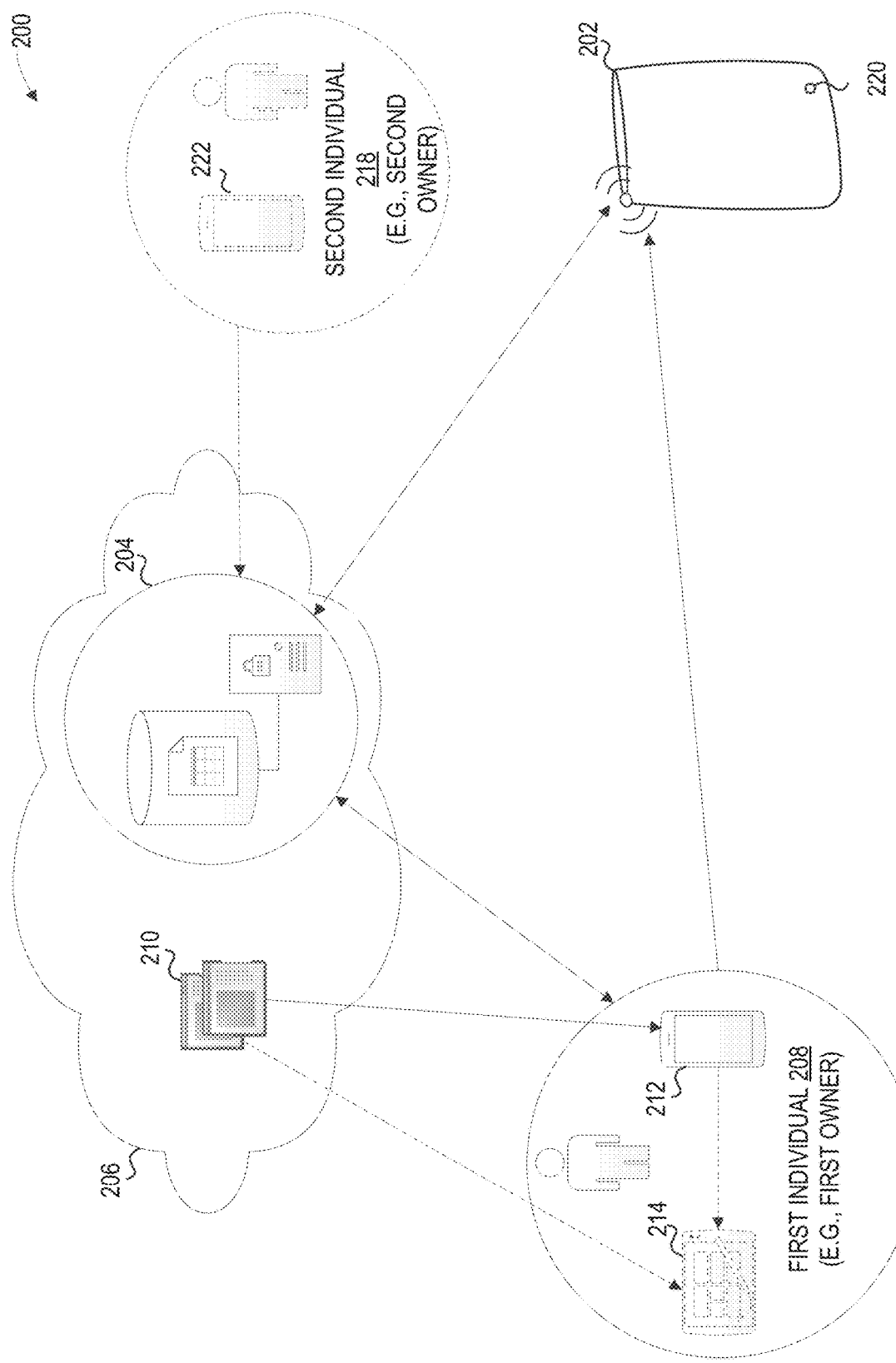
FIG. 2 is a block diagram that illustrates a networked system, consistent with various embodiments.

FIG. 2 is a block diagram that illustrates a networked system 200, consistent with various embodiments. The system 200 includes a network access device (NAD) 202. Examples of a network access device (or a "networking device") 202 may include a modem, router, access point, switch, etc. A network access device 202 may route or forward data representative of communications either coming from or destined for the network. For example, if the network access device 202 receives data packet(s) from a network (e.g., the internet) that are destined for an electronic device, then the network access device 202 can forward the data packet(s) to the corresponding electronic device, either directly or indirectly (e.g., via a satellite networking device, as further discussed below). As another example, if the network access device 202 receives data packet(s) from an electronic device that are destined for the network, then the network access device 202 can forward the data packet(s) to the network for transmission downstream.

When the network access device 202 initially goes online, it can communicate to the network-accessible server system 204 of a cloud system 206. The network-accessible server system 204 may include a computing device or series of computing device interconnected via a network. The network-accessible server system 204 may verify the boot certificate before claiming the network access device 202. Once the network access device 202 has been claimed, an agent deployed on the network access device 202 may be permitted to communicate with the network-accessible server system 204 without restriction. For example, using the agent, the network access device 202 can register with the network-accessible server system 204 to indicate that it has been brought online.

Meanwhile, the first individual 208 (e.g., current owner) may download a computer program 210 (e.g., a mobile application 210) for execution on the user devices 212 (e.g., a mobile phone) or 214 (e.g., a tablet computer). The mobile application 210 may be designed to control management of the network access device 202 exclusively by the first individual device with the mobile application 210 and a valid certificate that grants exclusive control to that first individual device. The mobile application 210 is preferably accessible via a web browser, desktop application, mobile application, or over-the-top (OTT) application. Accordingly, the mobile application 210 may be viewed on an electronic device 212. Examples of electronic devices include a personal computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

For example, an individual may initially download the mobile application 210 onto the user device 212 via a cellular network (e.g., LTE, 3G, 4G, etc.), log into the installed mobile application using credentials associated with the network-accessible server system 204, activate the relevant certificate, and specify that the individual (or user) would like to claim the network access device 202.

In some embodiments, the network-accessible server system 204 may generate a user profile indicative of an individual (e.g., first individual 208) and/or an electronic device 212 associated with the individual. The network-accessible server system 204 may store and/or access a plurality of user profiles corresponding to individual(s) and device(s).

The mobile application 210 may transmit a request to create a user profile to the network-accessible server system 204. The request to create a user profile may include information identifying the individual and/or an electronic device associated with that individual, such as a username. Further, the request to create a user profile may include credentials, a license key, proof of purchase, or a characteristic that identifies a device, such as a serial number.

The network-accessible server system 204 may generate a user profile based on the request to create a user profile. Each user profile may be stored and/or accessible to the mobile application 210 executing on the electronic device. The network-accessible server system 204 may associate each user profile with a network access device during a secure boot process, which is described in detail below.

In some embodiments, the network-accessible server system 204 may verify the request to generate a user profile by comparing the information provided in the request with verified information. For example, if the request includes a license key, the network-accessible server system 204 may compare the license key provided with any verified license keys accessible to the network-accessible server system 204. If the request information is identified as verified, the network-accessible server system 204 may generate the user profile.

Upon discovering that the individual has submitted a request to claim the network access device 202, a private key corresponding to a certificate residing on the network access device 202 can be transmitted to the network-accessible server system 204. Such action allows the network-accessible server system 204 to verify physical ownership of the network access device 202 by the user of the user device 212. In some embodiments, the mobile application 210 and the network access device 202 are mapped to each other to ensure that these objects are within a predetermined proximity during the registration process. Location may be estimated based on, for example, LAN or location (e.g., via geotagged IP addresses).

Devices within the networked environment 200 may be connected via a network. Examples of networks may include personal area networks (PANs), local area networks (LANs), wide area networks (WANs), metropolitan area networks (MANs), cellular networks, the Internet, etc. For example, mobile phone 212 may communicate with the network access device 202 via a network using a suitable wired and/or wireless communication protocol(s). In some embodiments, an electronic device (e.g., mobile phone 212) may connect to the network access device 202 via a short-range wireless communication protocol (e.g., Bluetooth®, Wi-Fi, etc.).

In some embodiments, upon boot, the lack of a digital certificate may prevent the network access device 202 from communicating with any other device except for the network-accessible server system 204. The network access device 202 may close some or all network ports to prohibit connection to any device except for the network-accessible server system 204. Closing some or all network ports may prevent unauthorized connectivity with a device.

In some embodiments, the network access device 202 facilitates a limited connection to allow communication between the electronic device 212 and the network-accessible server system 204. The limited connection may allow for local communication between the electronic device 212 and network-accessible server system 204 in the event the electronic device 212 cannot connect to a wireless network.

The network access device 202 may receive information from the electronic device 212 and forward the information to the network-accessible server system 204. In this limited connection, communication may only be allowed between the electronic device 212 and network-accessible server system 204 prior to a digital certificate being distributed to the network access device 202.

An online certificate can be transmitted (or "pushed") to the network access device 202. Until online certificate authentication occurs for a given user, the user may not be permitted to make any changes to the network access device 202. Accordingly, after the first time the user claims the network access device 202, all changes must happen though the network-accessible server system 204. If an unauthorized entity were able to compromise the online certificate, the online certificate can be easily changed since it is managed by the network-accessible server system 204. For example, the online certificate could be readily walked back, or replaced with a new online certificate.

In an embodiment, the network-accessible server system 204 may disassociate the network access device 202 with an individual (first individual 208 and/or an electronic device (e.g., mobile phone 212). As an example, the network-accessible server system 204 may disassociate the network access device 202 upon receipt of a request to disassociate the device 202 when the device 202 is returned to the manufacturer. Such disassociating may occur at both the network-accessible server system 204 and at the network access device 202. Upon disassociating a user profile and/or an online certificate from the first individual, a second individual (e.g., second individual and mobile phone 222) may subsequently claim the network access device 202 using the techniques as described herein.

To enable a secure boot, these devices can facilitate the creation of a connected network. Initially, birth certificates are generated for each device (i.e., hardware devices including network access devices and satellite devices). These birth certificates can be "sewn" or "burned" into a hardware device during the manufacturing process. Additionally, or alternatively, intermediate certificates can be generated for firmware verification. For example, each instance of firmware can be digitally signed using one of the intermediate certificates before being uploaded/programmed into a hardware device.

In some embodiments, a hash key is programmed in one-time programmable (OTP) memory of the hardware device. This can be done by the manufacturer (e.g., as part of a quality control procedure). Thereafter, the signed firmware can be programmed/uploaded to the hardware device. Thus, when the hardware device leaves the manufacturing facility, it can include a birth certificate and firmware signed with an intermediate certificate.

Network Access Device Overview

Figure 3:
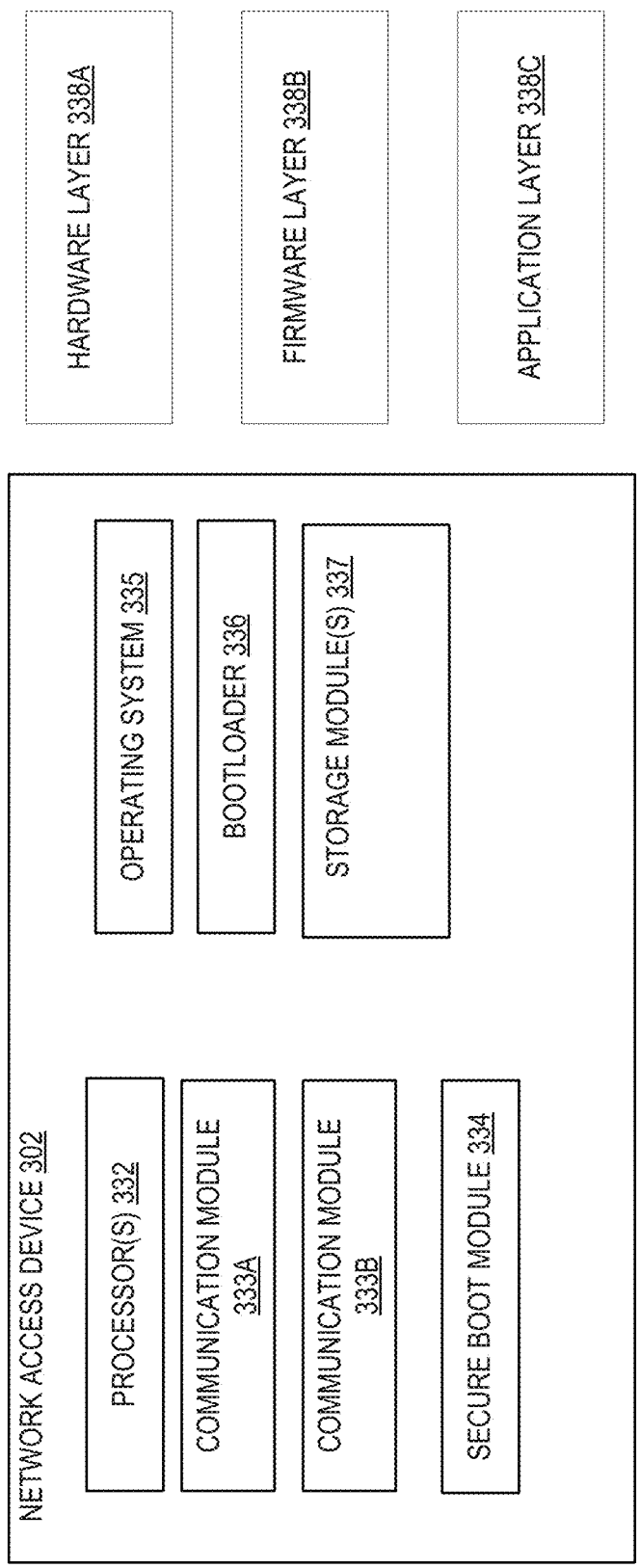
FIG. 3 is a high-level functional block diagram of a network access device, consistent with various embodiments.

FIG. 3 is a high-level functional block diagram illustrating the architecture of a network access device 302 that facilitates connections between electronic devices (e.g., personal computers, mobile phones, wearable items) and a network. The network access device 302 may be, for example, a router, modem, switch, access point (AP), etc. Some embodiments are described in the context of a router for purpose of illustration only. Those skilled in the art will recognize that similar technology may be used in conjunction with other types of network access devices. The network access device 302 may be, for example, network access device 202 of FIG. 2.

The network access device 302 can include one or more processors 332, communication module(s) 333A-B, a secure boot module 334, an operating system 335, a bootloader 336, and one or more storage modules 337.

The processor(s) 332 can execute instructions stored in the storage module(s) 337, which can be any device or mechanism capable of storing information. In some embodiments a single storage module includes multiple computer programs for performing different operations (e.g., establishing a communication channel with an electronic device, examining data packets within received traffic, etc.), while in other embodiments each computer program is hosted within a separate storage module.

In some embodiments, the network access device 302 may include at least three layers; a hardware layer 338A, a firmware layer 338B, and an application layer 338C. The hardware layer 338A of a network access device 302 may include the physical chipset-level of the network access device. A boot certificate (also referred to as a "birth certificate") may be "sewn" or "burned" into the hardware layer 338A of the network access device 302. For example, the boot certificate may be burned in a chipset-level location within the hardware layer 338A of the network access device. The boot certificate may include registration information that can be embedded within a secure, chipset-level location known only to the manufacturer.

The boot certificate may include information indicative of identifying the network access device 302. The boot certificate may include a serial number, license key, or other identifying information to identify the network access device 302. The boot certificate may verify physical ownership of the network access device 302, as the boot certificate may be physically stored on the hardware layer 338A of the network access device 302.

The hardware layer 338A of the network access device 302 may include a hash key programmed in one-time programmable (OTP) memory. OTP memory may include non-volatile memory that permits data be written to memory only once. OTP memory may be utilized during manufacturing of the network access device 302 to upload firmware onto the network access device 302. In some embodiments, if the network access device 302 receives firmware, the OTP memory can upload the firmware to the network access device 302. The OTP memory may include the boot certificate. When the network access device 302 leaves a manufacturing facility, the network access device 302 may include a birth certificate and firmware signed with an intermediate digital certificate.

The network access device 302 may include a firmware layer 338B. The firmware layer 338B may require that any firmware installed onto the network access device 302 be digitally signed to prevent any unauthorized entity from accessing and/or installing firmware onto the network access device.

In some embodiments, the network-accessible server system may periodically transmit updated firmware to the network access device 302. Each time updated firmware is transmitted from the network-accessible server system, the network-accessible server system may digitally sign the updated firmware.

The network access device 302 may include an application layer 338C. The application layer 338C may facilitate interaction with a mobile application (e.g., mobile application 210 of FIG. 2) to modify the settings of the network access device 302. The application layer 338C may include applications that can be read by, for example, a secure boot module 334. These applications can be developed by the manufacturer or a third party. While a mobile application may connect to the application layer 338C of the network access device 302, the application layer may be prevented from being activated until after the network access device 302 verifies that the application has been signed by the manufacturer. The application layer 338C may not connect to the mobile application until a digital certificate is distributed to the network access device 302.

The network access device 302 may include one or more communication modules 333A-B. Here, for example, the network access device 302 includes multiple communication modules 333A, 333B, which may be designed to communicate in accordance with different communication protocols. However, the network access device 302 could include a single communication module capable of communicating in accordance with multiple communication protocols or communicating along separate threads and/or frequency bands in accordance with a single communication protocol. The communication module(s) 333A-B can facilitate communication between various components of the network access device 302. Generally, the communication module(s) 333A-B communicate with other electronic device(s) by transmitting data wirelessly via an antenna. In some embodiments, the network access device 302 includes multiple antennas designed for communicating in accordance with various communication protocols described herein.

A first communication module 333A may route and/or forward network traffic between one or more electronic devices and a network, such as the Internet. For example, the communication module 333A may facilitate electronic communication with a mobile phone, tablet computer, or wearable item seeking to establish a connection with a network to which the network access device 302 is connected.

A second communication module 333B may route and/or forward local data packets between a computer program executing on an electronic device and a manufacturer platform executing on a network-accessible server system. The local data packets received at the network access device 302 may include provisioning and settings customization of the network access device 302. In some embodiments, the second communication module 333B may utilize a short-range wireless communication protocol to communicate with the computer program.

The secure boot module 334 can be configured to, upon startup, verify that firmware residing on the network access device 302 has been digitally signed. For example, the secure boot module 334 may examine the signature of the bootloader 336 to verify that it hasn't been modified. If the bootloader 336 is fully intact, the secure boot module 334 may permit the bootloader 336 to initiate the operating system 335.

Network Access Device Boot

Upon initialization of an acquired device (e.g., a network access device), the network access device may be onboarded onto a network. A manufacturer-authorized device may onboard and provision the network access device. An example of a manufacturer-authorized device is a computing device that is authorized by the manufacturer to securely provision and boot a device, such as a network-accessible server system. A network access device, such as a router, may initially connect to the manufacturer-authorized device during the start-up or initialization process (e.g., upon booting). When the network access device connects to the manufacturer-authorized device, the manufacturer-authorized device may authenticate the network access device. Authenticating the network access device may include inspecting the network access device to verify the identity of the network access device.

Generally, network access devices, during initialization, may be vulnerable to unauthorized access. A remote entity may attempt to access the network access device or transmit malware to the network access device upon boot. To address such vulnerabilities, network access devices may include authorization by a manufacturer-authorized device before the network access device is permitted to connect to a network.

Additionally, in many areas where a network access device is provisioned, there may be insufficient coverage to allow for the electronic device to communicate with a cellular node over a wireless cellular network. If the electronic device is unable to connect to a wireless cellular network and transmit a request to the manufacturer-authorized device, the secure boot process initiated by the network access device may be unsuccessful.

To address the inconsistent coverage of an electronic device to connect to a wireless network, a network-accessible server system may establish a geographical location of the network access device and a geographical location of an electronic device and determine that the geographical location of the network access device and the geographical location of the electronic device are within a predetermined proximity of one another. In some embodiments, establishing the geographical location of the electronic device includes examining an Internet Protocol (IP) address of the network access device. In other embodiments, determining that the network access device and the electronic device are communicatively coupled via a short-range wireless communication protocol, such as Bluetooth®, for example. This allows the network-accessible server system to determine that the electronic device is within a certain proximity of the network access device due to the connectivity range limits on such a short-range wireless communication protocol.

Figure 4:
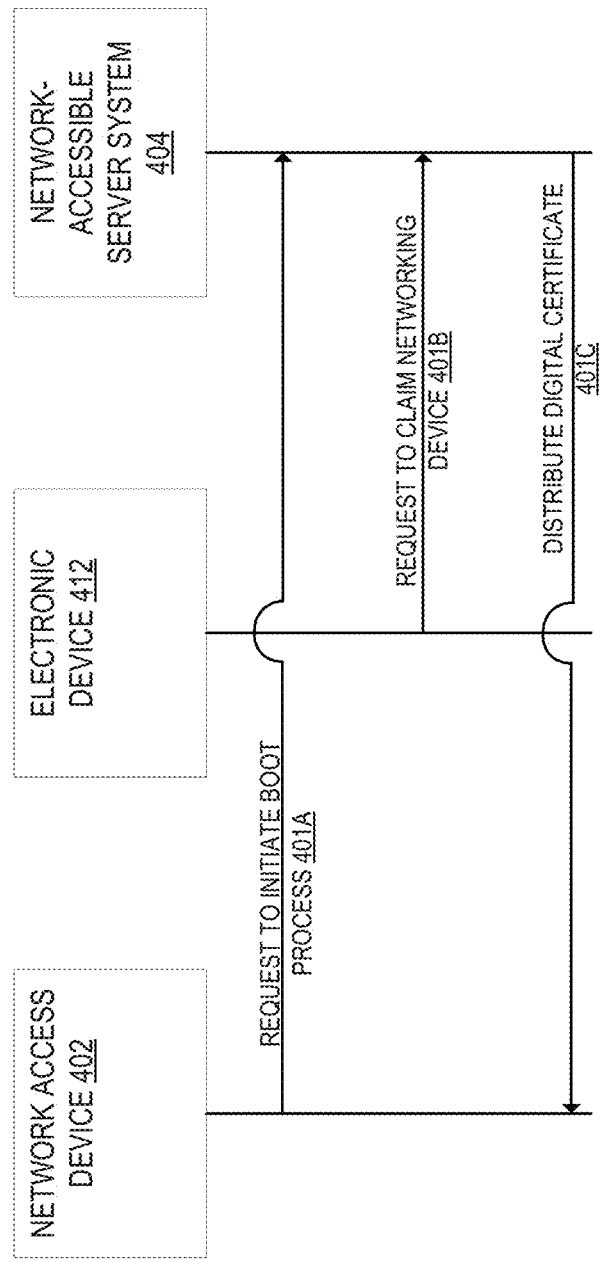
FIG. 4 is a flow diagram of a process to securely boot a network access device, consistent with various embodiments.

FIG. 4 illustrates a flow process to securely boot a network access device 402, consistent with various embodiments. A manufacturer platform 432 executing on a network-accessible server system 404 may receive an input 401A indicative of a request to initiate a boot process of a network access device 402 (or simply "request"). The input 401A may indicate that the network access device 402 is requesting to be booted and/or be associated with a user profile. The network access device 402 may transmit the boot request to the network-accessible server system 404 upon boot.

In some embodiments, the input indicative of a request to initiate a boot process includes information representing a boot certificate. The network-accessible server system may parse the request to discover information representing a boot certificate that identifies the network access device as the source of the request. The boot certificate includes information that is indicative of identifying the network access device 402, such as a code or serial number, for example. As described above with respect to FIG. 3, the boot certificate may be sewn into the hardware layer (e.g., 338A) of the network access device 402.

The network-accessible server system 404 may compare the boot certificate to a verified boot certificate. The network-accessible server system 404 may access a listing of all boot certificates for all network access devices, which may be referred to as a boot certificate registry. The boot certificate registry may be maintained on the network-accessible server system 404 or another device that is accessible to the network-accessible server system 404.

The network-accessible server system 404 may determine that the boot certificate matches a record in the registry corresponding to a verified boot certificate. If the boot certificate provided in the boot request does not correspond with any verified boot certificate, the network-accessible server system 404 may deny the boot request and prevent the network access device 402 from booting. Determining the validity of the boot certificate may prevent unauthorized entities from communicating with, and transmitting malware to, the network-accessible sever system 404 and the network access device 402.

The input 401A may include IP address data, such as the network access device IP address. The network access device IP address may include/convey sufficient information to identify the network in which the network access device belongs. The network access device IP address may represent geographical information of the network access device. The network access device IP address may be geotagged (e.g., the network access device IP address includes geographic location information to indicate the geographic location of the network access device).

The electronic device 412 may transmit a request 401B to claim the network access device 402 to the network-accessible server system 430. The request 401B may include identification information of the network access device 402, such as a serial number, license key, password, etc. The request 401B may also include user profile information that may be used by the network-accessible sever system 404 to associate the network access device 402 with the user profile.

The network-accessible sever system 404 may distribute a digital certificate 401C to the network access device 402 that permits the network access device 402 to complete the boot process. When the digital certificate is received at the network access device 402, network access device 402 may perform functionality such as forwarding network traffic. In some embodiments, the network-accessible sever system 404 may distribute the digital certificate after the request to initiate the boot process is verified and the geographical location of the network access device and the geographical location of the electronic device are within a predetermined proximity of one another, which is discussed in greater detail below.

Figure 5:
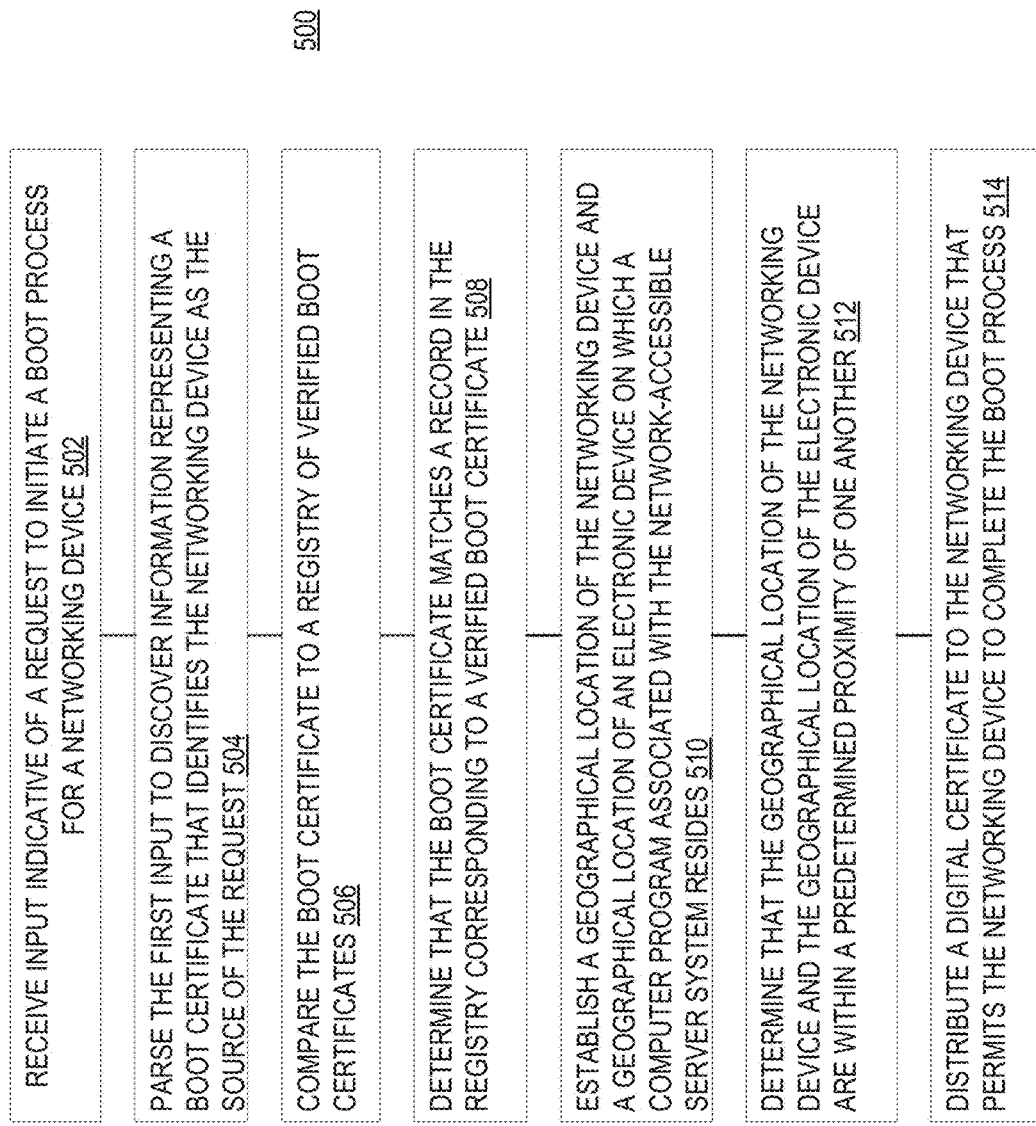
FIG. 5 is a flow diagram of a process for securely booting a network access device, consistent with various embodiments.

FIG. 5 is a flow diagram of a process 500 for booting a network access device, consistent with various embodiments.

The process 500 includes receiving, by a network-accessible server system, input indicative of a request to initiate a boot process for a network access device (block 502). The request to initiate a boot request, as described in FIG. 4 above, the request may indicate that a network access device is requesting to be booted and/or be associated with a user profile.

The process 500 includes parsing, by the network-accessible server system, the input to discover information representing a boot certificate that identifies the network access device as the source of the request (block 504). The boot certificate may include information that is indicative of identifying the network access device, such as a code, serial number, etc. The network-accessible server system may utilize a suitable parsing technique to discover the information representing the boot certificate.

The process 500 includes comparing, by the network-accessible server system, the boot certificate to a registry of verified boot certificates (block 506). The network-accessible server system may access a listing of all boot certificates for all network access devices, which may be referred to as a boot certificate registry. The boot certificate registry may be maintained on the network-accessible server system or another device that is accessible to the network-accessible server system.

The process 500 includes determining, by the network-accessible server system, that the boot certificate matches a record in the registry corresponding to a verified boot certificate (block 508). The network-accessible server system may access the boot certificate registry and reference the registry to determine whether the boot certificate provided in the boot request correlates with a verified boot certificate. If the boot certificate provided in the boot request does not correspond with any verified boot certificate, the network-accessible server system may deny the boot request and prevent the network access device from booting. Determining the validity of the boot certificate may prevent unauthorized entities from communicating with, and transmitting malware to, the network-accessible sever system and the network access device.

The process 500 includes establishing, by the network-accessible server system, a geographical location of the network access device and a geographical location of an electronic device on which a computer program associated with the network-accessible server system resides (block 510). An electronic device and/or a mobile application executing on an electronic device may store and transmit location data of the electronic device to geographically locate the electronic device. For example, the mobile application may store and transmit cellular connectivity data (e.g., cell site location information (CSLI)) and/or space satellite connectivity data (e.g., global positioning system (GPS) information) that may help determine the geographic location of the electronic device. The location data may be used to triangulate the geographic position of the electronic device within a network (e.g., a wireless cellular network). The electronic device may include an Internet Protocol (IP) address associated with a network. The IP address of the electronic device may include geotagging data or metadata that may be inspected to determine the geographic location of the electronic device. Similar location detection techniques may be utilized to determine the geographical location of the network access device.

The location data may be inspected to determine a geographical location of the electronic device within a network environment, such as a building, for example. The network-accessible server system may determine a geographical location of the electronic device relative to a reference point, such as a network access device, for example. The network-accessible server system may determine the geographical location and the distance between the network access device and the electronic device.

The process 500 includes determining, by the network-accessible server system, that the geographical location of the network access device and the geographical location of the electronic device are within a predetermined proximity of one another (block 512). This is discussed in greater detail with respect to FIG. 6.

The process 500 includes distributing, by the network-accessible server system, a digital certificate to the network access device that permits the network access device to complete the boot process (block 514). Distributing a digital certificate may indicate that the network access device has been securely booted and that the network access device is associated with a user profile.

In some embodiments, the user profile associated with a computer program may not alter any settings of the network access device until the digital certificate is distributed to the network access device. The digital certificate may be associated with a user profile, where the mobile application associated with the user profile may manipulate settings of the network access device when the digital certificate is distributed to the network access device. If an unauthorized entity were able to compromise the digital certificate, the digital certificate can be modified and/or redistributed by the network-accessible server system.

In some embodiments, the network-accessible server system may transmit updated firmware to the network access device. The updated firmware may be digitally signed by the network-accessible server system to prevent an unauthorized entity from accessing and/or installing firmware onto the network access device. A signature may include a manufacturer-authorized device, such as the network-accessible server system, verify that any new and/or updated firmware is approved and verified. The network-accessible server system may include an application that digitally signs any new firmware transmitted to the network access device. In some embodiments, an application executing on the network-accessible server system may allow for the firmware to be digitally signed. More specifically, the network-accessible server system may upload firmware to the network access device, digitally sign the firmware, and then attach the firmware to a secure location (e.g., the same location as the boot certificate).

Figure 6:
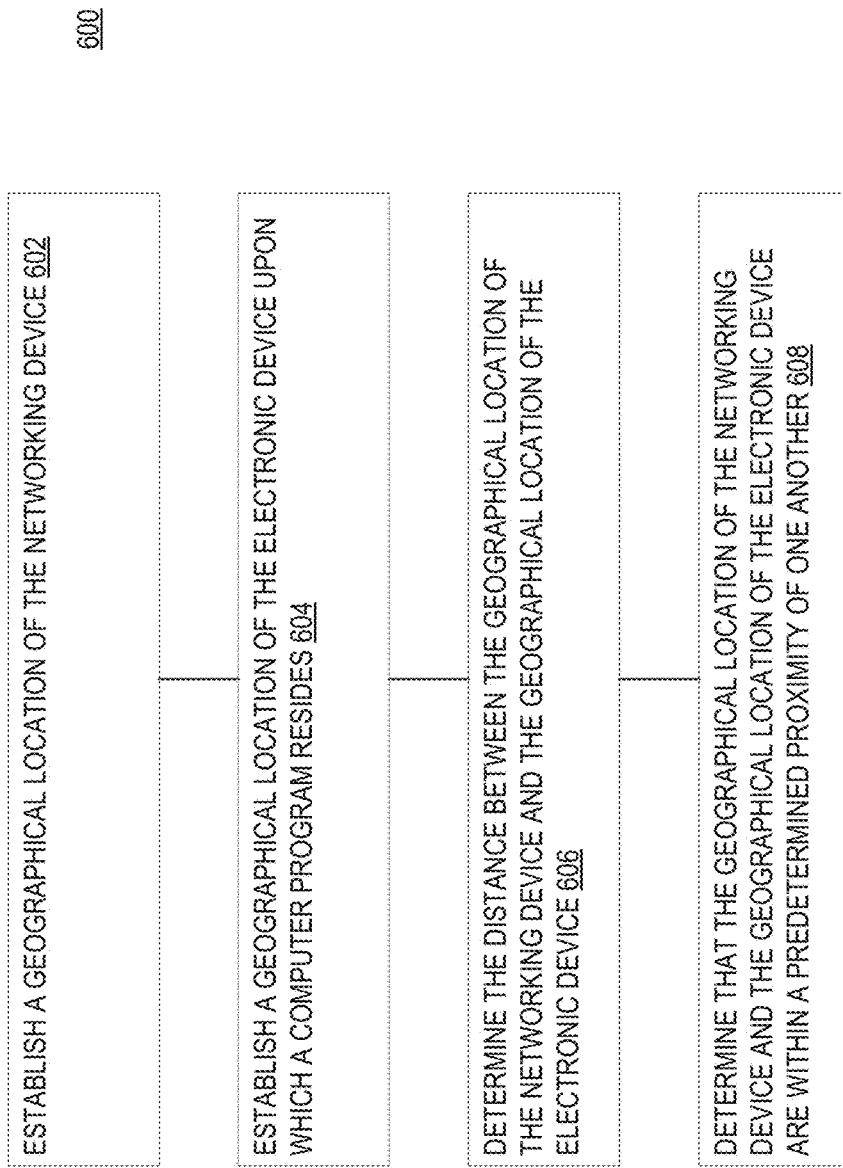
FIG. 6 is a flow diagram of a process to determine whether the geographical locations of a network access device and electronic device are within a predetermined proximity, consistent with various embodiments.

FIG. 6 is a flow process 600 to determine whether the geographical locations of a network access device and electronic device are within a predetermined proximity, consistent with various embodiments.

The process 600 includes establishing a geographical location of the network access device (block 602). In some embodiments, the network-accessible server system may determine the geographical location of the computer program and the network access device based on their respective IP addresses. The network-accessible server system may use geotagging information embedded within the data and/or metadata of the network access device IP address and the mobile application IP address to determine the geographical location of both the network access device and the computer program. The network-accessible server system may inspect the request to identify the network access device IP address and any geotagging data embedded therein. The network-accessible server system may inspect the request to claim a network access device to identify the mobile application IP address and any geotagging data embedded therein.

In some embodiments, the network-accessible server system may determine whether the network access device and the computer program are within a predetermined range based on determining that the network access device and the computer program are in electrical communication via a wireless communication protocol. Such wireless communication protocols may include, but are not limited to, Wi-Fi, Bluetooth® low energy (BLE), near-field communication (NFC), or Zigbee®. Because of the limited communication range of a short-range wireless communication protocol such as BLE, a geographical proximity between the network access device and mobile application is assumed if the network access device and computer program are communicatively coupled. In some embodiments, the network-accessible server system determines that the geographical location of the network access device and the computer program are within a predetermined range if the network access device and the computer program are communicatively coupled via BLE.

The process 600 includes establishing a geographical location of the electronic device upon which a computer program resides (block 604). Determining a geographical location of the electronic device may include any of the techniques described for block 602 above.

The process 600 includes determining the distance between the geographical location of the network access device and the geographical location of the electronic device (block 606). The network-accessible server system may measure the geographical distance between the electronic device and network access device based on the geographical location information established for each of the electronic device and the network access device. For example, the network-accessible server system may measure the longitudinal and latitudinal differences provided in global positioning data for each device to determine the distance between each device.

The process 600 includes determining that the geographical location of the network access device and the geographical location of the electronic device are within a predetermined proximity of one another (block 608). Determining that the computer program and the network access device are within a predetermined range may prevent remote unauthorized entities from connecting to the network access device or the network-accessible server system, as the remote unauthorized entity IP address would likely not be within the predetermined range of the network access device. The predetermined range may be a threshold geographic distance between the network access device and mobile application. The predetermined range may be any suitable distance provided at the network-accessible server system, such as 200 feet, for example. The network-accessible server system may store data representing the predetermined proximity, where the network-accessible server system compares the distance between the computer program and network access device with the data representing the predetermined proximity.

Satellite Device Boot Overview

Figure 7A:
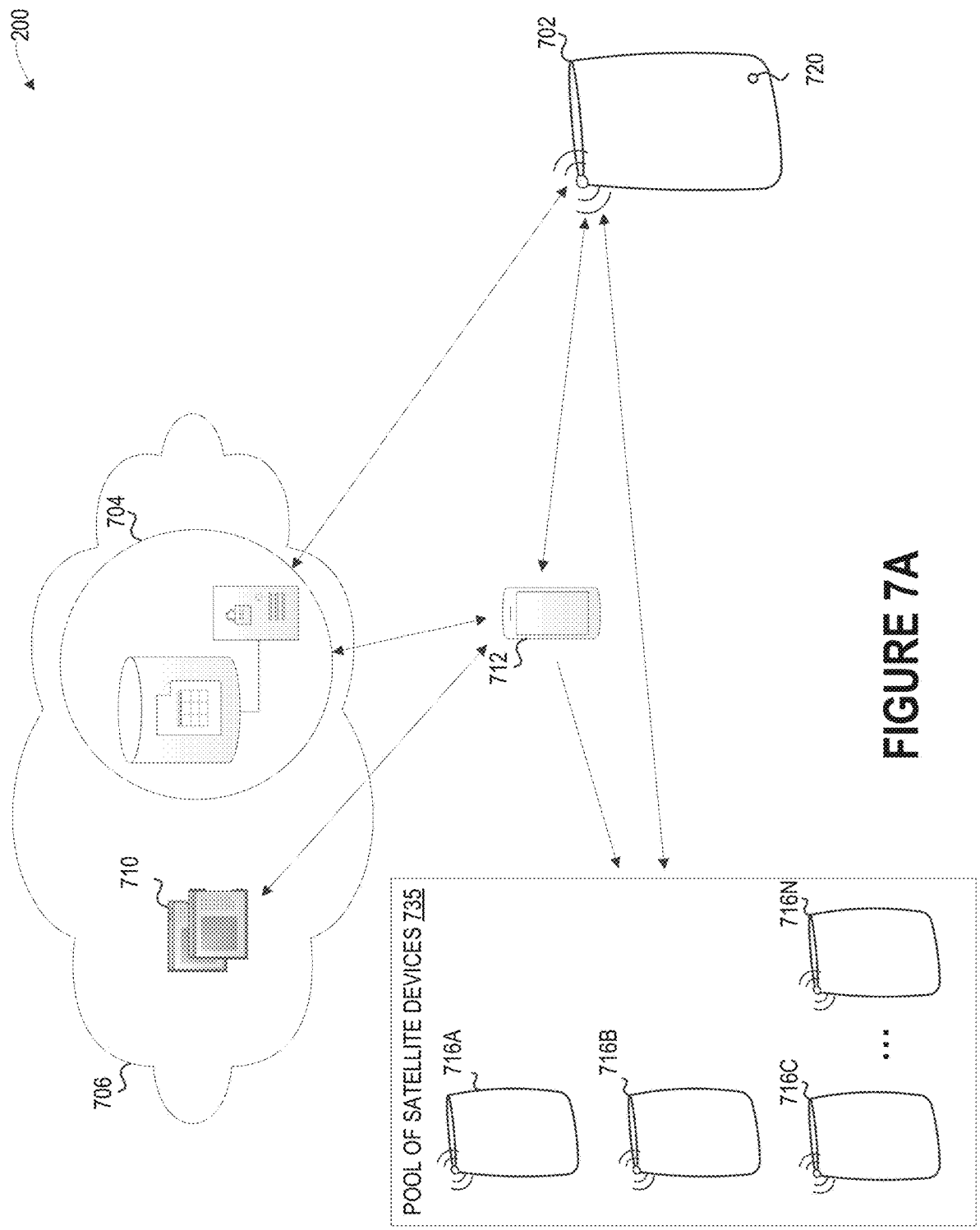
FIGS. 7A-C are schematic diagrams of a network environment including one or more satellite network access devices (or simply "satellite devices") consistent with various embodiments.

FIG. 7A is an illustration of a network environment 700A including one or more satellite networking devices (or simply "satellite devices"), consistent with various embodiments. In accordance with embodiments herein, a satellite device is a network-enabled device that is configured to forward network data between the network access device and local electronic devices connected to the satellite device. In an embodiment, the satellite device may be configured to direct network data to the network access device, where the network access device transmits/receives network data from the network, such as the Internet. Typically, the satellite device is used to improve the existing abilities of the network access device by extending the range or improving the signal strength of a network and so on. In an embodiment, the environment 700A may include a network access device 702, a computer program 710 executing on an electronic device 712, a network-accessible server system 704, and at least one satellite device (e.g., 716A-N from a pool of satellite devices 735). It should be appreciated that a typical networked environment (house, building) may have one or two satellite devices. However, an embodiment contemplates many satellite devices, such as N number of devices as depicted by Nth satellite device 716N. In an embodiment, network-accessible server system 704 includes a management platform (not shown), which is communicably connected to any of, all of, or any combination of: computer program 710, an application on network access device 702 (not shown), and an application on at least one satellite device 716A-N. Thus, any reference herein to network-accessible server system 704 may include the management platform.

In some embodiments, a satellite device, such as first satellite device 716A, may be configured to facilitate communication between electronic devices (e.g., personal computers, mobile phones, wearable items) and a network. For example, and in an embodiment, first satellite device 716A is configured to communicate with computer program 710 on electronic device 712. First satellite device 716A may be configured and used to improve the existing abilities of the network access device 702 by extending the range or improving the signal strength of the network.

Any satellite device 716A-N may communicatively couple to the network access device 702, and the network access device 702 may direct network data transmitted by such satellite devices. Satellite device(s) 716A-N may communicate with the network access device 702 via a suitable wireless communication protocol as described herein. Also, in an embodiment, any satellite device in the pool of satellite devices 735 may communicatively couple to another and different satellite device in the pool satellite devices 735 for the purposes of communicating with the network access device 702. For example, first satellite device 716A and second satellite device 716B may be configured in a series topology, and so on. In this example, second satellite device 716B sends data that is intended for network access device 702 directly to first satellite device 716A, first, and first satellite device 716A forwards the data on to network access device 702.

The network access device 702 may connect to one or more satellite device(s) 716A-N. Each satellite device (e.g., first satellite device 716A) communicably connected to the network access device 702 may be identifiable by the network access device 702. The network access device 702 may receive identification information from the satellite device (e.g., first satellite device 716A) upon being communicably connected to the satellite device. Identification information may include a boot certificate of the satellite device (e.g., first satellite device 716A), where the boot certificate is stored in the satellite device, for example. Or, the identification may include permission to access the boot certificate related information in storage in the manufacturer's cloud system. Identification information may include a satellite device serial number or IP address, for example.

One or more satellite devices may connect to the network access device 702 via a tree network topology. In a tree topology, each satellite device is configured to transmit network data to each of the other satellite devices and to the network access device. The network access device 702 is configured to transmit the network data to the network. An embodiment can be understood with reference to FIG. 7B. First satellite device 716A, second satellite device 716B, and third satellite device 716C are each communicably connected to network access device 702 via network 704D. In addition, first satellite device 716A is communicably connected to second satellite device 716B via the wireless communication 780a and to the third satellite device 716C via the wireless communication 780b. Second satellite device 716B also is communicably connected to third satellite device 716C via wireless communication 780c. Network access device 702 may be configured to further transmit the network data to the network (not shown). Multiple satellite devices may be interconnected, where each satellite device forwards network data through the tree network to the network access device 702. Multiple satellite devices may be interconnected across a tree network environment, such as a building, for example. The tree network may allow for multiple satellite devices to be interconnected, where the range of the wireless network may be extended due to the interconnectivity of multiple satellite devices located across the network environment.

One or more satellite devices may connect to the network access device 702 via a hub-and-spoke or star topology. In a hub-and-spoke topology, each satellite device is configured to transmit network data to the network access device and the network access device is configured to transmit the network data to the network. An embodiment can be understood with reference to FIG. 7C. First satellite device 716A is communicably connected to network access device 702 via a first wireless communication 790a. Second satellite device 716B is communicably connected to network access device 702 via a second wireless communication 790b. Third satellite device 716C is communicably connected to network access device 702 via a third wireless communication 790c. Network access device 702 is configured to further transmit the network data to the network (not shown).

Figure 7B:
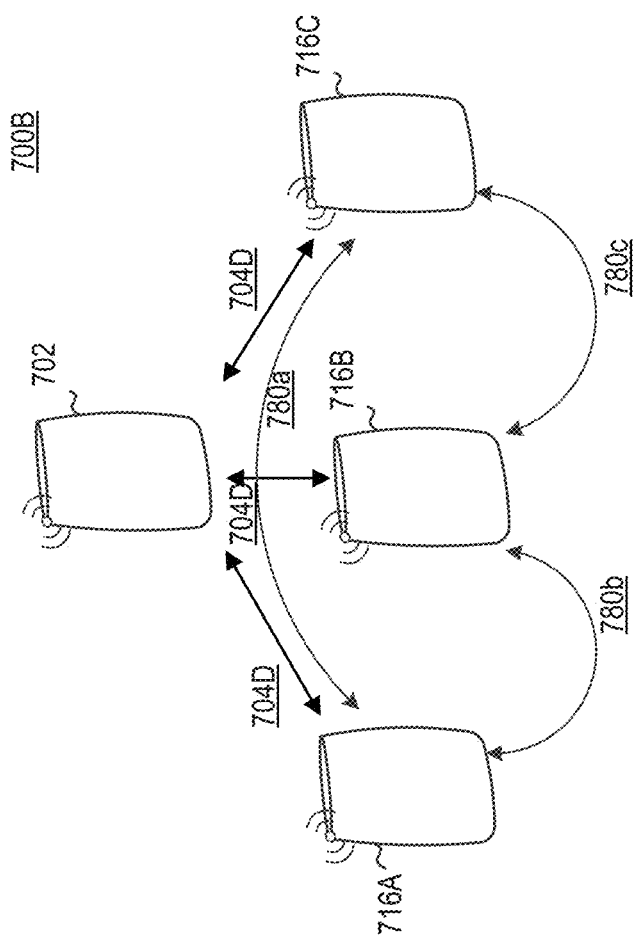
Figure 7C:
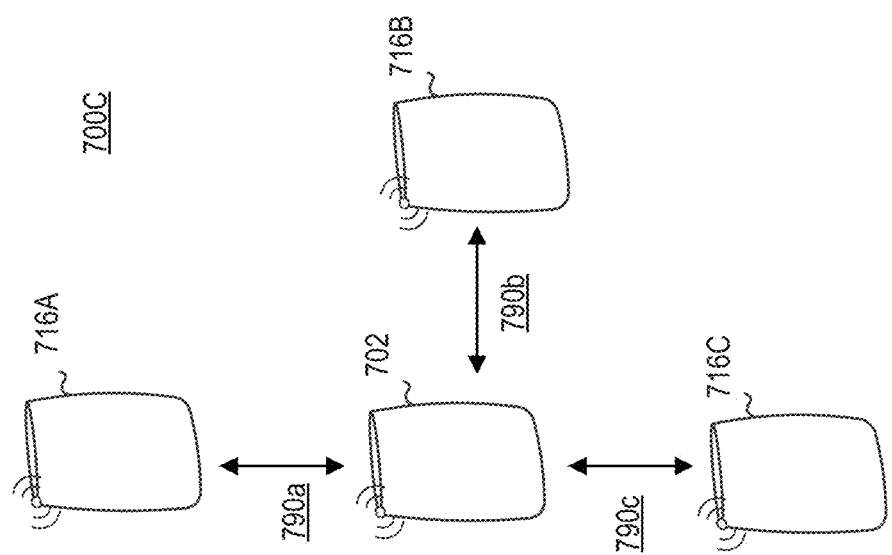

An electronic device 712 may communicatively couple to one or more satellite devices 716A-N. For example, the electronic device 712 may connect to the first satellite device 716A or the second satellite device 716B. In an embodiment, the electronic device may communicably connect to the satellite devices of the pool of satellite devices via a separate connection with each satellite device. For example, electronic device 712 may connect to the first satellite device 716A and connect to the second satellite device 716B via separate connections (not shown) over a network. The first satellite device 716A may receive network data from the electronic device 712 and direct the network data to the network access device 702. In a tree network architecture/topology (e.g., as shown in FIG. 7B), one satellite device may receive network data from another satellite device that was originally from electronic device over network and forward the network data to the network access device. For instance, the first satellite device 716A may receive network data from second satellite device 716B, who originally received the network data from electronic device 712, and the first satellite device 716A may forward the network data to the network access device 702. In an embodiment, electronic device 712 may also communicably connect to the network-accessible server system 704 via the network. Network can represent communication using networking protocol or it can represent cellular protocols. Or, network can represent communication using both types of protocols. One skilled in the art can understand which protocol is being used, depending on the context. Further, electronic device 712 and network access device 702 may be communicably connected via a network. In an embodiment, network-accessible server system 704 is communicably connected to network access device 702.

Onboarding or Booting a Satellite Device

An embodiment of a high-level process for onboarding or booting a satellite device can be understood with reference to FIG. 7A. It should be appreciated that the particulars are for illustrative purposes and are not meant to be limiting. For purposes of discussion, it is assumed that second satellite device 716B has not yet been provisioned, but a user desires to do so. Second satellite device 716B becomes alive, for example by the user turning on the device. It should further be appreciated that second satellite device 716B does not connect to any port of network access device 702 and, therefore, does not have or obtain Internet connectivity of its own.

Upon activation, second satellite device 716B electronically communicates with electronic device 712, which is within a predetermined range or proximity, by way of short-range wireless communication protocol, such as Bluetooth® Low Energy (BLE), for example. More specifically, second satellite device 716B is configured to communicate with computer program 710 and computer program 710 is also configured to receive and process communication from second satellite device 716B. In an embodiment, second satellite device 716B was previously provisioned, e.g., by the manufacturer, with a unique certificate. That is, a satellite boot certificate (also referred to as a satellite "birth certificate") may have been embedded, e.g., sewn or burned, into the hardware layer of second satellite device 716B. The satellite boot certificate may include registration information that can be embedded within a secure, chipset-level location known only to the manufacturer. Thus, in response to being activated, second satellite device 716B transmits its satellite boot certificate to computer program 710. In another embodiment, the registration information of second satellite device 716B stored on any of the devices in the environment, such as network-accessible server system 704, electronic device 712, or network access device 702. It should be appreciated that upon activation, second satellite device 716B may also send signals to network access device 702, however, network access device 702 can be configured to ignore such signals until certain conditions are met as described below.

Upon receipt of the satellite boot certificate, computer program 710 transmits the satellite birth certificate and appropriate credentials of computer program 710 to network-accessible server system 704. In a different embodiment, upon a type of notification, computer program 710 transmits data, identifying that the user is in possession of second satellite device 716B, to network-accessible server system 704. For example, a user can take a photograph of the serial number of the second satellite device 716B and transmit the photograph along with the appropriate credentials of computer program 710 to network-accessible server system 704. In another embodiment, computer program 710 accesses a birth certificate of second satellite device 716B stored on electronic device 712 or network access device 702 and transmit such accessed birth certificate along with the appropriate credentials of computer program 710 to network-accessible server system 704.

Upon receipt of the satellite boot certificate or data indicating that the user is in possession of second satellite device 7166 and the credentials of computer program 710, network-accessible server system 704 verifies, using the received credentials, that computer program 710 is a valid application in its system. Also, network-accessible server system 704 verifies that the satellite boot certificate or data indicating that the user is in possession of second satellite device 716B is legitimate. For instance, one or more verified satellite boot certificates may be listed on a satellite boot certificate registry on or associated with network-accessible server system 704. Network-accessible server system 704 compares the received satellite boot certificate to a satellite boot certificate stored in the satellite boot certificate registry. Upon a match, network-accessible server system 704 knows that the received satellite boot certificate is valid. As an example, and for illustrative purposes, a satellite boot certificate can contain or be associated with a serial number of second satellite device 716B. In another embodiment, network-accessible server system 704 compares the received data indicating the user is in possession of second satellite device 716B with previously stored data. Upon a match, network-accessible server system 704 knows that the received data indicating the user is in possession of second satellite device 716B is valid. Examples of credentials of computer program 710 may include, but are not limited to, user name and password or any identifier agreed upon between computer program 710 and network-accessible server system 704. It should be appreciated that validating that the user of the computer program 710 is valid and that the user is in possession of the satellite device may be performed in a particular sequence or in parallel.

Upon verifying that the user of computer program 710 is valid and that the satellite boot certificate or possession of second satellite device 716B is valid, network-accessible server system 704 associates second satellite device 716B with computer program 710 and/or network access device 702 for further communication.

In an embodiment, upon associating computer program 710 and second satellite device 716B, network-accessible server system 704 pushes a digital certificate intended for second satellite device 716B through or via network access device 702. In another embodiment, upon associating computer program 710 and second satellite device 716B, network-accessible server system 704 grants permission for second satellite device 716B to have access to network access device 702. For example, network-accessible server system 704 may send a notification to network access device 702 to accept any requests by second satellite device 716B for access to the network. In another embodiment, upon receiving a request from second satellite device 716B to access the network, network access device 702 may transmit a verification request to network-accessible server system 704 or to computer program 710 intended for network-accessible server system 704. Upon receiving such verification request, network-accessible server system 704 can check whether second satellite device 716B is an associated device. When second satellite device 716B is an associated device, network-accessible server system 704 can send a notification indicating that permission to access the network is granted. When second satellite device 716B is not an associated device, network-accessible server system 704 can send a notification indicating that permission to access the network is denied.

A specialized public key infrastructure (PKI) accessible to the network-accessible server system 704 can be configured to facilitate the distribution of online certificates, each of which may include a public encryption key, to the network access device(s), mobile application(s), and/or satellite device(s) associated with a local network. The network-accessible server system may communicate with the PKI via application programming interfaces (APIs), bulk data interfaces, etc. Generally, the network-accessible server system 704 will request a separate certificate for each mobile application and satellite device. For example, if the network access device is setup to be connected to a single mobile application and four satellite devices distributed throughout an environment (e.g., a home), then the network-accessible server system 204 may request five certificates and distribute a unique certificate to the mobile application and satellite devices.

Intermediate digital certificates may be distributed by one of the network-accessible server system 704. Intermediate digital certificates may be generated for firmware verification. The intermediate digital certificates may include information indicative of identifying the network-accessible server system 704. The network-accessible server system 704 may digitally sign the firmware by providing information identifying the network-accessible server system 704 on the intermediate digital certificate. The network access device may receive the intermediate digital certificate and determine that firmware has been digitally signed and is verified.

Upon receiving the digital certificate, second satellite device 716B may have access to the Internet by using network access device 702. In an embodiment, if network access device 702 is not within communication range of second satellite device 716B, second satellite device 716B may communicate with network access device 702 by using first satellite device 740, for example as in a daisy chain configuration or tree configuration. For example, in a user's household, the user's router (user's network access device) may be physically in the basement floor and the user's satellite device is in the upstairs kitchen. Thus, as the user walks up the stairs from the basement to one of the upstairs rooms, the user's cell phone access to the Internet may switch from being communicably connected directly to the user's router to being communicably connected directly to the user's satellite device, which is communicably connected directly to the user's router. To continue with the example, as the user walks downstairs, the user's cell phone access to the Internet may switch again from being communicably connected directly to the user's satellite device to being communicably connected directly to the user's router.

Automatic Firmware Update

An automatic firmware update process and system is provided according to one or more embodiments. Providing for automatic updates of firmware can help to ensure an improved secure networking environment. For instance, relying on a customer to update his or her satellite device might result in the customer's satellite device lacking a security upgrade. In this and similar scenarios, the satellite device might be vulnerable to a malware attack because the satellite device lacks an antidote to the malware that was made available in a later version of the firmware.

In an embodiment and any of the satellite devices 716A-N, network access device 702, network-accessible server system 704, and computer program 710 may be configured to determine whether any satellite device (e.g., second satellite device 716B) is configured with the most up-to-date or required firmware. It should be appreciated that while one satellite (e.g., second satellite device 716B) may be used as an example in the following discussion, it is for illustrative purposes and is not meant to be limiting. In the example, the satellite boot certificate or other metadata associated with the satellite boot certificate can indicate an initial firmware version, which can be used by any of the above-cited entities to determine whether the firmware presently loaded on second satellite device 716B matches the presently required firmware. For instance, a user could have purchased the satellite device months before installing the satellite device. It therefore could be possible that a newer version of the firmware became available during the time after the purchase and before installation. Thus, in this example, at installation, the firmware associated with the satellite boot certificate is not up-to-date.

In an embodiment, network-accessible server system 704 pushes the required firmware intended for second satellite device 716B by using network access device 702. In an embodiment, the firmware that gets pushed onto any satellite device is digitally signed so that any configured entity can verify whether the firmware is valid and not malware imposing as legitimate firmware. In another embodiment, network access device 702 may have the required firmware itself and may push such required firmware intended for second satellite device 716B itself. In any way, embodiments herein ensure that a secure configuration is deployed to second satellite device 716B, once second satellite device 716B has been brought online.

An embodiment for monitoring firmware updates includes a satellite device being configured to identify its current firmware status and to send such status to the network access device or to the network-accessible server system. In an embodiment, the network access device determines whether the firmware status is up-to-date and, when not, either pushes a firmware update in its storage to the satellite device or transmits a request to the network-accessible server system for the most up-to-date firmware for the satellite device. In an embodiment, the network-accessible server system determines whether the firmware status is up-to-date and, when not, pushes a firmware update in its storage to the satellite device.

In an embodiment for monitoring firmware updates in a tree network architecture of two or more satellite devices, a first satellite can ping the other satellites in the tree network for the purposes of receiving their respective firmware versions. The first satellite is configured to compare its firmware version with received firmware versions. If the first satellite device concludes that their respective firmware versions match, then the first satellite device is configured to conclude that no firmware update is required. The first satellite device may send an update notification intended for the network-accessible server system. The first satellite device may be further configured to conclude that its firmware version is different from any of the other received firmware versions. The first satellite device, upon detecting that its firmware version does not match all other firmware versions, may be configured to report to the network-accessible server system that there is a discrepancy in firmware versions. In an embodiment, the network-accessible server system pushes the latest firmware version to the first satellite device. In another embodiment, the first satellite device, upon detecting that its firmware version does not match all other firmware versions, may be configured to report to the network access device that there is a discrepancy in firmware versions. In an embodiment, the network access device pushes the latest firmware version to the first satellite device. In an embodiment, upon receiving a notification from the first satellite device that there is a discrepancy of firmware versions on the network, the network access device may transmit a firmware update request to the network-accessible server system for firmware updates for the first satellite device and, optionally, for the other satellite devices on the network.

In an embodiment for monitoring firmware updates, each of the satellite devices on the network can upon request or periodically transmit their respective firmware statuses to the network access device. The network access device is configured to decide whether any firmware upgrades are required for any of the satellite devices on the network. In an embodiment, when an upgrade is required, the network access device can make a request for such upgrade to the network-accessible server system for the upgrade. In an embodiment, the network-accessible server system can automatically push a firmware upgrade for any satellite device to the network access device. Network access device can be configured to, upon receipt of the automatically pushed firmware upgrade from the network-accessible server system, automatically decide which satellite needs the upgrade and automatically push such upgrade to the satellite device, It should be appreciated that network-accessible server system 704 may push other configurations intended for second satellite device 716B via network access device 702. For example, such configurations enable second satellite device 716B to be fully operative on network access device 702. As another example, using electronic device 712 and computer program 710, a user can configure second satellite device 716B by setting suitable parameters through a user interface on computer program 710 that connects with network-accessible server system 704. Then, network-accessible server system 704 pushes the entered configurations intended for second satellite device 716B via network access device 702.

Upon obtaining Internet connectivity, second satellite device 716B initiates self-registration in network-accessible server system 704. Such an arrangement allows network access device 702 and any number of satellites to be connected to network-accessible server system 704, as well as the computer program 710, regardless of whether electronic device 712 resides within the network associated with network access device 702. When electronic device 712 resides outside of such network, changes requested through computer program 710 can be carried out by network-accessible server system 704. In some embodiments, each of a plurality of satellites within the network is connected to network access device 702 in accordance with a hub-and-spoke approach (i.e., each satellite is connected directly to network access device 702). In other embodiments, the satellites within the network are permitted to form a tree network architecture. Thus, each satellite need not necessarily be directly connected to the network access device. For example, as shown in FIG. 7A, second satellite device 716B can be connected to first satellite device 740, which is connected to network access device 702.

By installing a separate digital certificate on each of network access device 702, computer program 710, and satellite device(s) (e.g., first satellite device 740 and second satellite device 716B), network-accessible server system 704 can ensure that these objects are tied together. Consequently, for an unauthorized entity to gain access to the network, the unauthorized entity would need to acquire the digital certificate in addition to the credentials (e.g., username and password) used to log into computer program 710.

As described above, a specialized public key infrastructure (PKI) accessible to the network-accessible server system (e.g., network-accessible server system 704) can be configured to facilitate the distribution of digital certificates, each of which may include a public encryption key, to the network access device(s) (e.g., network access device 702), mobile application(s) (e.g., computer program 710), and satellite(s) (e.g., first satellite device 740 and second satellite device 716B) associated with a network. The network-accessible server system may communicate with the PKI via application programming interfaces (APIs), bulk data interfaces, etc. Generally, the network-accessible server system will request a separate certificate for each mobile application and satellite. For example, if the network access device is set up to be connected to a single mobile application and four satellites distributed throughout an environment (e.g., a home), then the network-accessible server system may request five certificates and distribute a unique certificate to each of the mobile application and satellites.

Intermediate digital certificates may be distributed by one of the network-accessible server system 704 or the PKI module 734. Intermediate digital certificates may be generated for firmware verification. The intermediate digital certificates may include information indicative of identifying the network-accessible server system 704. The network-accessible server system 704 may digitally sign the firmware by providing information identifying the network-accessible server system 704 on the intermediate digital certificate. The network access device 702 may receive the intermediate digital certificate and determine that firmware has been digitally signed and is verified.

One benefit of the tree architecture described herein is that security risk can be lessened even when the network access device and the satellite(s) are produced by different entities. For example, an individual may have a router manufactured by Comcast® and an Orbi® Wi-Fi System manufactured by NETGEAR® deployed within her home. In such instances, the individual can log into a mobile application executing on her mobile phone, claim the network access device, and configure each satellite. In some embodiments, the network access device is configured to communicate with the satellite (s). For instance, in such embodiments, traffic received at either level (e.g., by the network access device or the satellite devices) can be examined for threats. In other embodiments, the satellite(s) operate independent from the network access device. In such embodiments, only traffic received by the satellite(s) may be examined for threats.

According to embodiments herein, each time a new electronic device (e.g., a new satellite device or a new mobile device) comes onto the network, the satellite device or the network access device to which the new electronic device connects can transmit a notification to the associated mobile application. The notification may prompt the user to specify whether network access should be permitted. While this type of multi-factor approval process requires an express indication of approval from a network administrator (e.g., the user responsible for deploying the network access device and/or satellite(s)), it can significantly lessen the security risk of unauthorized access. Administrator authorization may be required even if the party attempting to access the network has acquired the necessary credentials (e.g., the password).

In some embodiments and as described above, each network access device and/or satellite within a network environment is configured to automatically update its firmware. Thus, in accordance with embodiments herein, when these objects are properly connected (e.g., via a tree architecture), the firmware across all of the devices will be consistent. Such action ensures that a hacker cannot gain unauthorized access via a security flaw in an older firmware version that has not yet been manually updated by the network administrator.

Figure 8:
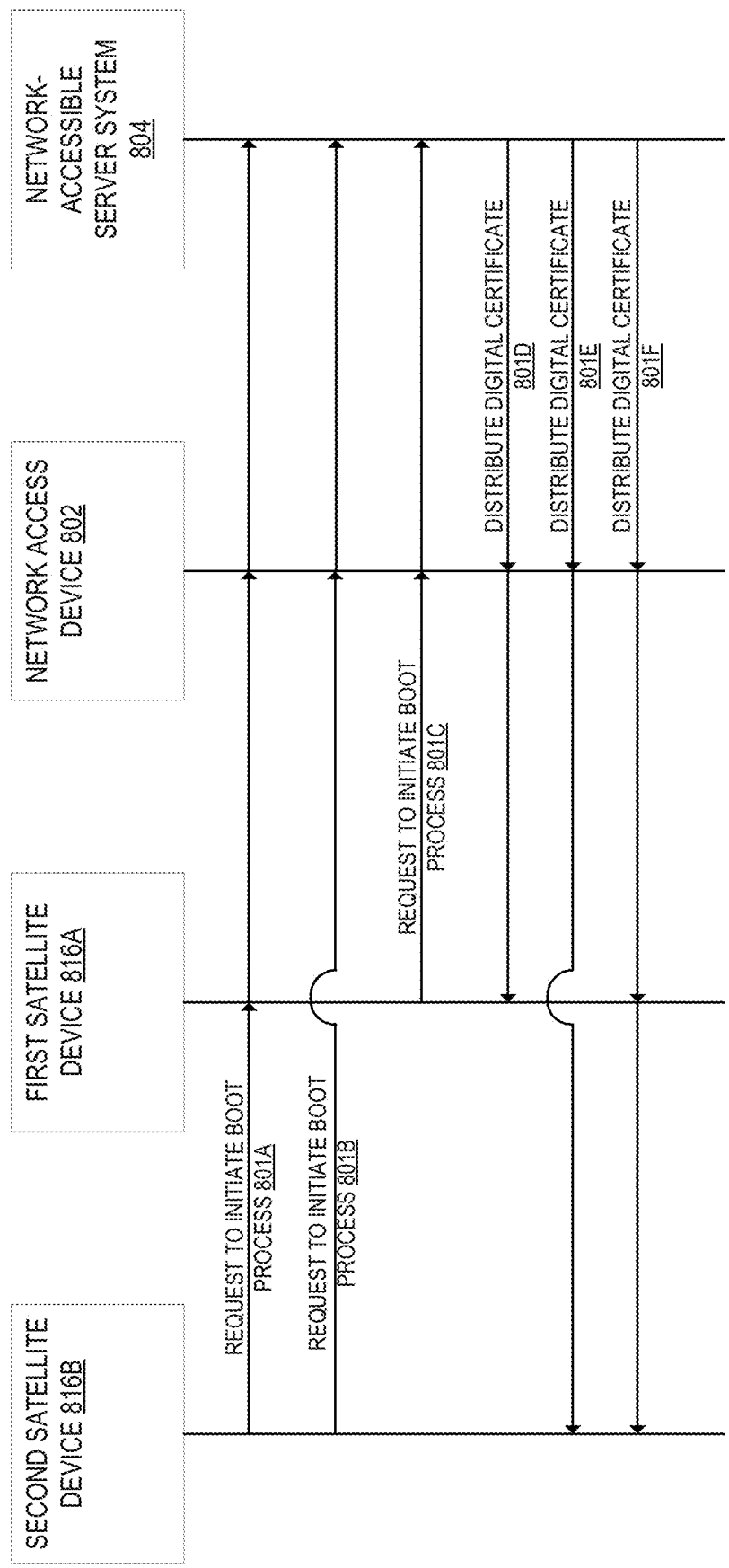
FIG. 8 is a flow diagram of a process for securely booting a satellite device, consistent with various embodiments.

FIG. 8 depicts a flow process for booting a satellite device, consistent with various embodiments. As shown in FIG. 8, in an embodiment, the second satellite device may transmit a request to initiate a boot process to the network-accessible server system. At request 801, the second satellite device 816B transmits the request to the first satellite device 816A via a tree network. The first satellite device 816A forwards the request to the network access device 802, and the network access device 802 in turn forwards the data to the network-accessible server system 804.

At request 801B, in another embodiment, the second satellite device 816B is in direct communication with the network access device 802, and the request is transmitted to the network access device 802 and forwarded at the network access device 802 to the network-accessible server system 804.

At request 801C, in an embodiment, the first satellite device 816A is in direct communication with the network access device 802, and the request is transmitted to the network access device 802 and forwarded at the network access device 802 to the network-accessible server system 804.

At request 801D, the network-accessible server system 804 distributes a digital certificate to the first satellite device 816A. The digital certificate is transmitted to the first satellite device 816A via the network access device 802. In another embodiment (not shown), the network-accessible server system 804 transmits a notification to the first satellite device 816A, the notification indicating that permission has been granted for the first satellite device to boot. For instance, the notification can include informational data that activates a digital certificate that was previously embedded in the satellite device, for example, by the manufacturer.

At request 801E, the network-accessible server system 804 distributes a digital certificate to the second satellite device 816B. The digital certificate is transmitted to the second satellite device 816B via the network access device 802. Similarly, as above, in another embodiment (not shown), the network-accessible server system 804 transmits a notification to the second satellite device 816B, the notification indicating that permission has been granted for the second satellite device to boot. For instance, the notification can include informational data that activates a digital certificate that was previously embedded in the satellite device, for example, by the manufacturer.

At request 801F, the network-accessible server system 804 distributes a digital certificate to the second satellite device 816B via a tree network. In the tree network, the network-accessible server system 804 transmits the digital certificate to the network access device 802. The network access device 802 forwards the digital certificate to the first satellite device 816A, where the first satellite device 816A forwards the digital certificate to the second satellite device 816B. Similarly, as above, in another embodiment (not shown), the network-accessible server system 804 transmits a notification to the network access device 802, the notification indicating that permission has been granted for the second satellite device 816B to boot. For instance, the notification can include informational data that activates a digital certificate that was previously embedded in the satellite device, for example, by the manufacturer. The network access device 802 forwards the notification to the first satellite device 816A, where the first satellite device 816A forwards the notification to the second satellite device 816B.

FIG. 9 is a high-level flow diagram of a process 900 for onboarding or booting a satellite device, from the network-accessible server system point of view, consistent with various embodiments. At 902, the network-accessible server system receives from a mobile application a satellite boot request. In an embodiment, the satellite boot request includes a satellite boot certificate of a satellite device and mobile application credentials (e.g., an email address and password). In another embodiment (not shown), the network-accessible server system receives mobile application credentials and data indicative of ownership of the satellite device. Examples of data indicative of ownership of the satellite device may include a photograph of the satellite device, showing a bar code of the satellite device, scanning a bar code depicted on the satellite device, showing the serial number of the satellite device, and so on. At 904, the network-accessible server system checks whether the satellite boot certificate corresponds with a verified satellite boot certificate. In another embodiment (not shown), the network-accessible server system checks whether the data indicative of ownership of the satellite device corresponds with verified the data indicative of ownership of the satellite device, e.g., stored on the network-accessible server system. When there is no verification, onboarding or booting is denied, and the process stops. At 906, the network-accessible server system checks, using the received credentials, whether the mobile application is valid and, if not, onboarding or booting is denied, and the process stops. At 908, upon determining that both the satellite boot certificate (or similarly, data indicative of ownership of the satellite device) and the mobile application credentials are valid, the network-accessible server system distributes, using a network access device, an digital certificate (or a notification indicative of permission to access the network) associated with the network access device, intended for the satellite device. At block 910 and subsequent to distributing the digital certificate or permission notification to the satellite device, receiving a registration request, initiated from the satellite device, containing suitable registration data. At 912, the network-accessible server system subsequently grants the registration request and registers the satellite device.

Processing System

Figure 10:
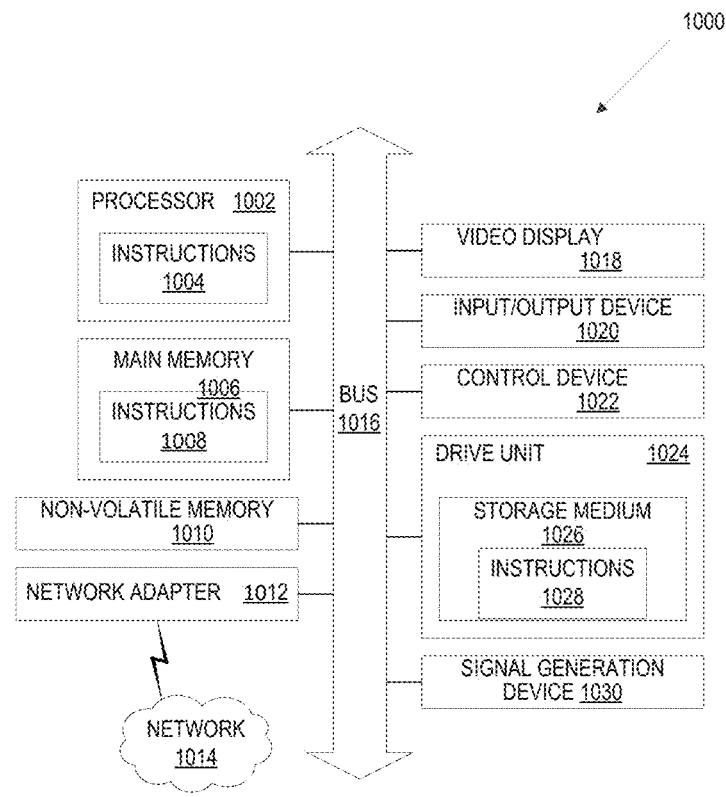
FIG. 10 is a block diagram illustrating an example of a processing system in which at least some operations described herein can be implemented.

FIG. 10 is a block diagram illustrating an example of a processing system 1000 in which at least some operations described herein can be implemented. For example, some components of the processing system 1000 may be hosted on a network access device(e.g., network access device 202 of FIG. 2), a satellite device (e.g., first satellite device 716A of FIG. 7A), a network-accessible server system (e.g., network-accessible server system 204 of FIG. 2), or an electronic device on which a mobile application (e.g., computer program 210 of FIG. 2) resides.

The processing system 1000 may include one or more central processing units ("processors") 1002, main memory 1006, non-volatile memory 1010, network adapter 1012 (e.g., network interface), video display 1018, input/output devices 1020, control device 1022 (e.g., keyboard and pointing devices), drive unit 1024 including a storage medium 1026, and signal generation device 1030 that are communicatively connected to a bus 1016. The bus 1016 is illustrated as an abstraction that represents one or more physical buses and/or point-to-point connections that are connected by appropriate bridges, adapters, or controllers. The bus 1016, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 1000 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 1000.

While the main memory 1006, non-volatile memory 1010, and storage medium 1026 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1028. The term "machine-readable medium" and "storage medium" shall also be taken to include any medium that is capable of storing, encoding, or carrying a set of instructions for execution by the processing system 1000.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in a computing device. When read and executed by the one or more processors 1002, the instruction(s) cause the processing system 1000 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1010, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1012 enables the processing system 1000 to mediate data in a network 1014 with an entity that is external to the processing system 1000 through any communication protocol supported by the processing system 1000 and the external entity. The network adapter 1012 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1012 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method performed by a network-accessible server system for securely booting a satellite device of a network access device onto a network, the method comprising:
   receiving, from a mobile device application, a satellite device boot request, wherein the request comprises data indicative of ownership of the satellite device and mobile device application credentials;
   verifying that the received data indicative of ownership of the satellite device corresponds with previously stored data indicative of ownership of the satellite device, wherein if the verification fails, denying the request and stopping the method;
   verifying, using the received mobile device application credentials, that the mobile device application is valid and, if not, denying the request and stopping the method;
   upon determining that both the data indicative of ownership of the satellite device and the mobile device application credentials are valid, permitting, via the network access device, the satellite device to boot onto the network;
   subsequent to permitting the satellite device to boot onto the network, receiving a registration request, initiated from the satellite device, containing registration data to associate the satellite device with the mobile device application; and
   granting the registration request and associating the satellite device with the mobile device application to complete the secure boot process.

2. The method of claim 1, wherein said data indicative of ownership of the satellite device comprises a satellite boot certificate of the satellite device.

3. The method of claim 1, wherein said data indicative of ownership of the satellite device comprises any of: a digital photograph of the satellite device; a digital photograph of a bar code of the satellite device; a digital photograph of a serial number of the satellite device; and resulting data of scanning a bar code depicted on the satellite device.

4. The method of claim 1, wherein said permitting further comprises:
distributing a digital certificate via the network access device or via the mobile device application to the satellite device that permits the satellite device to complete the boot process.

5. The method of claim 1, wherein said permitting further comprises:
transmitting a notification indicative of permission for the satellite device to access the network to either of the mobile device application or the network access device.

6. The method of claim 1, further comprising:
pushing digitally signed updated firmware via the network access device or via the mobile device application to the satellite device.

7. The method of claim 1, wherein the satellite device is a member of a tree network architecture of two or more satellite devices.

8. A network-accessible server system for securely booting a satellite device of a network access device onto a network, comprising:
a processor; and
a memory storing instructions that, when executed by the processor, cause the processor to:
receive, from a mobile device application, a satellite device boot request, wherein the request comprises data indicative of ownership of the satellite device and mobile device application credentials;
verify that the received data indicative of ownership of the satellite device corresponds with previously stored data indicative of ownership of the satellite device, and to deny the request and stop the method when the verification fails;
verify, using the received mobile device application credentials, that the mobile device application is valid, and to deny the request and stop the method when the verification fails;
permit, via the network access device, the satellite device to boot onto the network, upon determining that both the data indicative of ownership of the satellite device and the mobile device application credentials are valid;
receive a registration request, initiated from the satellite device, containing registration data to associate the satellite device with the mobile device application, subsequent to permitting the satellite device to boot onto the network; and
to grant the registration request and associate the satellite device with the mobile device application to complete the secure boot process.

9. The network-accessible server system of claim 8, wherein said data indicative of ownership of the satellite device comprises a satellite boot certificate of the satellite device.

10. The network-accessible server system of claim 8, wherein said data indicative of ownership of the satellite device comprises any of: a digital photograph of the satellite device; a digital photograph of a bar code of the satellite device; a digital photograph of a serial number of the satellite device; and resulting data of scanning a bar code depicted on the satellite device.

11. The network-accessible server system of claim 8, wherein said permitting further comprises:
distributing a digital certificate via the network access device or via the mobile device application to the satellite device that permits the satellite device to complete the boot process.

12. The network-accessible server system of claim 8, wherein said permitting further comprises:
transmitting a notification indicative of permission for the satellite device to access the network to either of the mobile device application or the network access device.

13. The network-accessible server system of claim 8, further comprising:
pushing digitally signed updated firmware via the network access device or via the mobile device application to the satellite device.

14. The network-accessible server system of claim 8, wherein the satellite device is a member of a tree network architecture of two or more satellite devices.

15. A non-transitory computer-readable medium storing instructions that, when executed by a processor, causes the processor to perform operations comprising:
receiving, from a mobile device application, a satellite device boot request, wherein the request comprises data indicative of ownership of the satellite device and mobile device application credentials;
verifying that the received data indicative of ownership of the satellite device corresponds with previously stored data indicative of ownership of the satellite device, wherein if the verification fails, denying the request and stopping the method;
verifying, using the received mobile device application credentials, that the mobile device application is valid and, if not, denying the request and stopping the method;
upon determining that both the data indicative of ownership of the satellite device and the mobile device application credentials are valid, permitting, via the network access device, the satellite device to boot onto the network;
subsequent to permitting the satellite device to boot onto the network, receiving a registration request, initiated from the satellite device, containing registration data to associate the satellite device with the mobile device application; and
granting the registration request and associating the satellite device with the mobile device application to complete the secure boot process.

16. The non-transitory computer-readable medium of claim 15, wherein said data indicative of ownership of the satellite device comprises a satellite boot certificate of the satellite device.

17. The non-transitory computer-readable medium of claim 15, wherein said data indicative of ownership of the satellite device comprises any of: a digital photograph of the satellite device; a digital photograph of a bar code of the satellite device; a digital photograph of a serial number of the satellite device; and resulting data of scanning a bar code depicted on the satellite device.

18. The non-transitory computer-readable medium of claim 15, wherein said permitting further comprises:

distributing a digital certificate via the network access device or via the mobile device application to the satellite device that permits the satellite device to complete the boot process.

19. The non-transitory computer-readable medium of claim 15, wherein said permitting further comprises:
transmitting a notification indicative of permission for the satellite device to access the network to either of the mobile device application or the network access device.

20. The non-transitory computer-readable medium of claim 15, further comprising:
pushing digitally signed updated firmware via the network access device or via the mobile device application to the satellite device.

21. The non-transitory computer-readable medium of claim 15, wherein the satellite device is a member of a tree network architecture of two or more satellite devices.

* * * * *